United States Patent
Snyderman et al.

(10) Patent No.: US 7,787,135 B2
(45) Date of Patent: *Aug. 31, 2010

(54) SYSTEM AND METHOD FOR DEVELOPING A CONFIGURATION FOR A COMBINATION OF TWO OF MORE PRINTSHOPS

(75) Inventors: David Snyderman, Brighton, NY (US); Timothy W. Jacobs, Fairport, NY (US); Jie Lin, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 978 days.

This patent is subject to a terminal disclaimer.

(21) Appl. No.: 11/495,856

(22) Filed: Jul. 28, 2006

(65) Prior Publication Data

US 2008/0030767 A1 Feb. 7, 2008

(51) Int. Cl.
*G06F 3/12* (2006.01)
(52) U.S. Cl. .............. 358/1.13; 358/1.15; 358/1.1; 358/1.9; 400/62; 400/61; 400/63; 700/99; 700/100; 700/32; 700/36
(58) Field of Classification Search .............. 358/1.13, 358/1.15, 1.1, 1.14, 1.16, 1.11, 1.9, 1.12; 705/8, 9; 718/102, 104, 106; 709/102, 105
See application file for complete search history.

(56) References Cited

U.S. PATENT DOCUMENTS

| 5,287,194 | A | * | 2/1994 | Lobiondo | .............. 358/296 |
| 6,573,910 | B1 | | 6/2003 | Duke et al. | |
| 7,051,328 | B2 | | 5/2006 | Rai et al. | |
| 7,079,266 | B1 | | 7/2006 | Rai et al. | |
| 7,125,179 | B1 | * | 10/2006 | Rai et al. | .............. 400/62 |
| 2003/0149747 | A1 | | 8/2003 | Rai et al. | |
| 2005/0065830 | A1 | | 3/2005 | Duke et al. | |

* cited by examiner

*Primary Examiner*—Benny Q Tieu
*Assistant Examiner*—Martin Mushambo
(74) *Attorney, Agent, or Firm*—Fay Sharpe LLP

(57) ABSTRACT

A system is provided for forming a print shop configuration with a first set of equipment, the first set of equipment being derived from a second set of equipment from a first print shop and a third set of equipment from a second print shop. The system includes a print shop configuration manager for determining whether a selected relationship exists between (1), one or more sets of job requirements and at least one of a set of print processing related cells or (2) two sets of print processing related cells. A possible print shop configuration may be discarded or prioritized, based on the existence of the selected relationship.

23 Claims, 14 Drawing Sheets

| | | | Job Data | | | | |
|---|---|---|---|---|---|---|---|
| JobID | Arrival | Due | Nbooks | BW/Printing | ColorPrinting | Scanning | Packaging |
| 272028 | 9/9/2004 7:59:00 AM | 9/10/2004 4:00:00 PM | 4000 | 4000 | 0 | 0 | 0 |
| 272031 | 9/9/2004 9:00:00 AM | 9/10/2004 4:00:00 PM | 360 | 0 | 360 | 0 | 0 |
| 271542 | 9/9/2004 9:00:00 AM | 9/10/2004 4:00:00 PM | 1190 | 1190 | 0 | 330 | 0 |
| 272033 | 9/9/2004 10:00:00 AM | 9/10/2004 4:00:00 PM | 500 | 0 | 500 | 0 | 0 |
| 255272 | 9/9/2004 10:00:00 AM | 9/10/2004 4:00:00 PM | 3055 | 3055 | 0 | 300 | 0 |
| 272027 | 9/10/2004 7:00:00 AM | 9/10/2004 4:00:00 PM | 1172 | 1172 | 0 | 0 | 0 |
| 272035 | 9/13/2004 9:00:00 AM | 9/15/2004 4:00:00 PM | 16017 | 16017 | 0 | 0 | 0 |
| 271565 | 9/13/2004 9:00:00 AM | 9/13/2004 4:00:00 PM | 5520 | 5520 | 0 | 0 | 0 |
| 271562 | 9/13/2004 10:59:00 AM | 9/13/2004 4:00:00 PM | 6640 | 6640 | 0 | 40 | 0 |
| 271563 | 9/13/2004 10:59:00 AM | 9/13/2004 4:00:00 PM | 14950 | 14950 | 0 | 0 | 0 |
| 271560 | 9/13/2004 10:59:00 AM | 9/13/2004 4:00:00 PM | 10250 | 10250 | 0 | 0 | 0 |
| 271561 | 9/13/2004 11:29:00 AM | 9/13/2004 1:59:00 PM | 180 | 0 | 180 | 0 | 0 |
| 271564 | 9/13/2004 11:29:00 AM | 9/14/2004 4:00:00 PM | 4400 | 4400 | 0 | 0 | 0 |
| 271567 | 9/14/2004 10:00:00 AM | 9/14/2004 4:00:00 PM | 11700 | 11700 | 0 | 0 | 0 |
| 271566 | 9/14/2004 10:00:00 AM | 9/14/2004 4:00:00 PM | 14400 | 14400 | 0 | 0 | 0 |
| 278192 | 9/14/2004 1:00:00 PM | 9/15/2004 4:00:00 PM | 5640 | 5640 | 0 | 0 | 0 |
| 271568 | 9/15/2004 10:59:00 AM | 9/15/2004 4:00:00 PM | 2310 | 2310 | 0 | 0 | 0 |

FIG. 3

| Date | BWPrinting |
|---|---|
| 9/9/2004 | 513 |
| 9/10/2004 | 660 |
| 9/13/2004 | 8625 |
| 9/14/2004 | 6194 |
| 9/15/2004 | 1573 |

FIG. 4

| Job Data | | | | | | | |
|---|---|---|---|---|---|---|---|
| JobID | Arrival | Due | Nbooks | BW/Printing | ColorPrinting | Scanning | Packaging |
| 272028 | 9/9/2004 7:59:00 AM | 9/10/2004 3:00:00 PM | 4000 | 4000 | 0 | 0 | 0 |
| 272031 | 9/9/2004 9:00:00 AM | 9/10/2004 3:00:00 PM | 360 | 0 | 360 | 0 | 0 |
| 271542 | 9/9/2004 9:00:00 AM | 9/10/2004 3:00:00 PM | 1190 | 1190 | 0 | 330 | 0 |
| 272033 | 9/9/2004 10:00:00 AM | 9/10/2004 3:00:00 PM | 500 | 0 | 500 | 0 | 0 |
| 255272 | 9/9/2004 10:00:00 AM | 9/10/2004 3:00:00 PM | 3055 | 3055 | 0 | 300 | 0 |
| 272027 | 9/10/2004 7:00:00 AM | 9/10/2004 4:00:00 PM | 1172 | 1172 | 0 | 0 | 0 |
| 272035 | 9/13/2004 9:00:00 AM | 9/15/2004 3:00:00 PM | 16017 | 16017 | 0 | 0 | 0 |
| 271565 | 9/13/2004 10:59:00 AM | 9/13/2004 3:00:00 PM | 5520 | 5520 | 0 | 0 | 0 |
| 271562 | 9/13/2004 10:59:00 AM | 9/13/2004 3:00:00 PM | 6640 | 6640 | 0 | 40 | 0 |
| 271563 | 9/13/2004 10:59:00 AM | 9/13/2004 3:00:00 PM | 14950 | 14950 | 0 | 0 | 0 |
| 271560 | 9/13/2004 11:29:00 AM | 9/13/2004 3:00:00 PM | 10250 | 10250 | 0 | 0 | 0 |
| 271561 | 9/13/2004 11:29:00 AM | 9/13/2004 12:59:00 PM | 180 | 0 | 180 | 0 | 0 |
| 271564 | 9/14/2004 10:00:00 AM | 9/14/2004 3:00:00 PM | 4400 | 4400 | 0 | 0 | 0 |
| 271567 | 9/14/2004 10:00:00 AM | 9/14/2004 3:00:00 PM | 11700 | 11700 | 0 | 0 | 0 |
| 271566 | 9/14/2004 10:00:00 AM | 9/14/2004 3:00:00 PM | 14400 | 14400 | 0 | 0 | 0 |
| 278192 | 9/14/2004 1:00:00 PM | 9/15/2004 3:00:00 PM | 5640 | 5640 | 0 | 0 | 0 |
| 271568 | 9/15/2004 10:59:00 AM | 9/15/2004 3:00:00 PM | 2310 | 2310 | 0 | 0 | 0 |

FIG. 6

| Date | BWPrinting |
|---|---|
| 9/9/2004 | 548 |
| 9/10/2004 | 715 |
| 9/13/2004 | 10862 |
| 9/14/2004 | 7280 |
| 9/15/2004 | 1758 |

FIG. 7

|  | Shop1 | Shop2 | Shop3 |
|---|---|---|---|
| Shop1 | 8625 | 10682 | 14858 |
| Shop2 | 10386 | 9078 | 9382 |
| Shop3 | 6633 | 3379 | 3160 |

FIG. 8

|  | Shop1 | Shop2 |  |
|---|---|---|---|
| Shop1 | 8625 |  |  |
| Shop2 |  | 9078 |  |
| Shop3 |  | 3379 |  |
| Total | 8625 | 12457 | 21082 |

FIG. 9

|  | Shop1 | Shop2 | Shop3 |  |
|---|---|---|---|---|
| Shop1 |  | 10682 |  |  |
| Shop2 |  | 9078 |  |  |
| Shop3 |  |  | 3160 |  |
| Total | 0 | 19940 | 3160 | 23100 |

FIG. 10

|  | Shop1 | Shop2 | Shop3 |  |
|---|---|---|---|---|
| Shop1 | 8625 |  |  |  |
| Shop2 |  |  | 9382 |  |
| Shop3 |  |  | 3160 |  |
| Total | 8625 | 0 | 12542 | 21167 |

FIG.11

| CONSOLIDATION OPTION | TYPE | TAKT-RATE REQUIREMENT |
|---|---|---|
| Shop1 & Shop2 | TWO LOCATIONS | 21082 |
| Shop1 & Shop3 | TWO LOCATIONS | 21167 |
| Shop2 & Shop3 | TWO LOCATIONS | 23100 |
| Shop2 | SINGLE LOCATION | 23319 |
| Shop1 | SINGLE LOCATION | 25644 |
| Shop3 | SINGLE LOCATION | 27400 |

FIG.12

FIG. 14
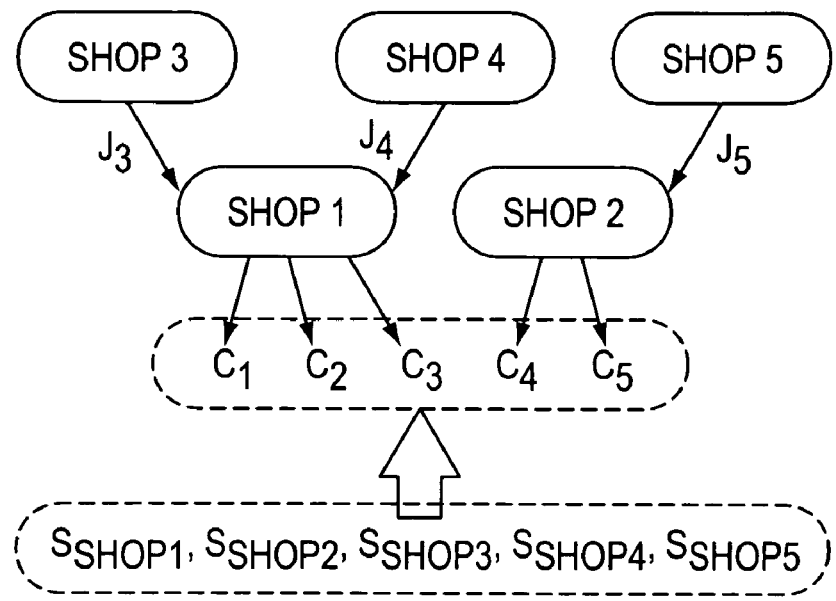
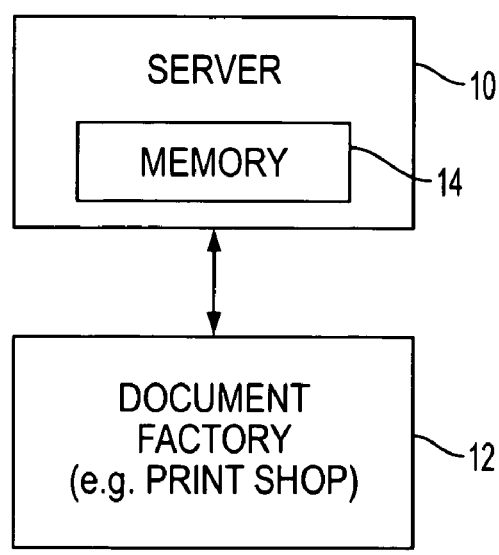
FIG. 15

SYSTEM AND METHOD FOR DEVELOPING A CONFIGURATION FOR A COMBINATION OF TWO OF MORE PRINTSHOPS

RELATED APPLICTIONS

Cross-reference is made to the following, commonly assigned applications: U.S. patent application. Ser. No. 11/495,857, filed Jul. 28, 2006 by Snyderman et al., entitled "SYSTEM AND METHOD FOR DEVELOPING A CONFIGURATION FOR A COMBINATION OF TWO OR MORE PRINTSHOPS", U.S. patent application. Ser. No. 11/495,393, filed Jul. 28, 2006, by Snyderman et al., entitled "SYSTEM AND METHOD FOR DEVELOPING A PRINTSHOP CONFIGURATION", U.S. patent application. Ser. No. 11/495,855, filed Jul. 28, 2006, by Snyderman et al., entitled "SYSTEM AND METHOD FOR DEVELOPING A PRINTSHOP CONFIGURATION".

BACKGROUND AND SUMMARY

The disclosed embodiments relate generally to forming a print shop configuration at a target site or print shop with pieces of equipment from multiple sets of equipment where at least one of the multiple sets of equipment has its origin in a print shop other than the target print shop.

Conventional print shops typically are organized in a fashion so that related equipment is grouped together. For example, printing equipment may be grouped and located together, while finishing equipment may be grouped and located in another location. Thus, the print shop may be set up to have a printing department, a finishing department, and other departments corresponding to the type of process or operation that is performed within that department. The organization of a print shop is typically often independent of print job complexity, print job mix and total volume of print jobs.

When a new print job arrives, the print job sequentially passes through each department until the print job is completed. The conventional approach leads to significant time delays and increased work-in-progress and inventory costs.

In accordance with an improved approach, a print shop may be reorganized into autonomous cells as disclosed in U.S. patent application Ser. No. 09/706,430 by Rai et al. (filed Nov. 3, 2000), the pertinent portions of which are incorporated by reference. For each autonomous cell in a corresponding group, resources (e.g., equipment or stations) are grouped together according to different job classes commonly encountered by a specific print shop.

An enterprise of geographically distributed print shops is a frequent occurrence in the production printing industry. Typically, resources in print shops are organized so that when a print job arrives from a customer at a particular print shop, the print job can be processed by performing one or more production functions. Maintaining print shops at multiple locations often necessitates providing the same labor and facilities at each individual site which, in turn, can lead to inefficient distribution of equipment and labor among the print shops.

As evidenced by the disclosure of U.S. patent application Ser. No. 11/185,202, filed by Rai et al. on Jul. 19, 2005, the pertinent portions of which are incorporated herein by reference, consolidating n print shops (also referred to below as "source sites") into k print shops (also referred to below as "target site(s)) can save labor and facility costs.

Pursuant to consolidation of even a few source sites into one or two target sites, the target sites would include multiple sets of cells, with each cell typically including multiple stations or equipment pieces. It would not necessarily be apparent, even to a highly experienced print shop designer, how to distribute the equipment from the source sites over the multiple sets of cells of the target sites to obtain a highly functional configuration for the target sites. The process of deciding how equipment pieces should be distributed over the cells can be particularly challenging unless the print shop designer has a comprehensive grasp of both a significant number of print shop configurations available for use, and a criterion for selecting a suitable configuration from the significant number of configurations.

It should be noted that having a comprehensive grasp of available print shop configurations can be rather challenging since the number of possible configurations can be quite significant for print shops employing even a relatively small number of equipment pieces (i.e., "stations") and/or cells. Moreover, it is not uncommon to have, among the number of possible print shop configurations, a significant number of irrelevant configurations (i.e., configurations incapable of processing many of the print jobs encountered at a given print shop) and/or redundant or equivalent configurations. It would be desirable to provide an approach for developing a print shop configuration (for at least two or more consolidated print shops) permitting a configuration designer to be apprised of which print shop configuration, among a group of print shop configurations, is either irrelevant or redundant.

In accordance with one aspect of the disclosed embodiments, there is provided a system for forming a print shop configuration for a first print shop, the print shop configuration being capable of processing print jobs, with each print job corresponding with a set of print job processing requirements. The print shop configuration forming system including: (A) a first set of multiple pieces of equipment, wherein the first set of multiple pieces of equipment is compiled from a second set of multiple pieces of equipment and a third set of multiple pieces of equipment, the second set of multiple pieces of equipment having been corresponded with the first print shop prior to said compilation, and the third set of equipment having been corresponded with a second print shop; (B) a set of multiple print shop cells, each print shop cell being associated with at least one piece of equipment from the first set of multiple pieces of equipment; (C) a memory, wherein a value corresponding with the multiple print shop cells to be used in forming the print shop configuration is stored in said memory, and wherein each cell includes at least one piece of equipment from the first set of multiple pieces of equipment; and (D) a print shop configuration development manager communicating with said memory and including an application, said print shop configuration development manager and said application functioning cooperatively to (1) generate a list of two or more possible print shop configurations that could be formed with the multiple print shop cells to be used in forming the print shop configuration and least some of the pieces of equipment from the second set of multiple pieces of equipment and the third set of multiple pieces of equipment, and (2) determine for one of the two or more possible print shop configurations, whether a selected relationship exists between one or more sets of print job requirements and at least one of the multiple print shop cells to be used in forming the print shop configuration, and (3) delete the one of the two or more possible print shop configurations from the list when the selected relationship does not exist.

In accordance with another aspect of the disclosed embodiments, there is provided a a system for forming a print shop configuration for a first print shop, the print shop configuration being capable of processing print jobs. The system includes: (A) a first set of multiple pieces of equipment, wherein the first set of multiple pieces of equipment is compiled from both a second set of multiple pieces of equipment and a third set of multiple pieces of equipment, the second set of multiple pieces of equipment having been corresponded with the first print shop prior to said compilation, and the third set of equipment having been corresponded with a second print shop; (B) a set of multiple print shop cells, each print shop cell including at least one piece of equipment from the first set of multiple pieces of equipment; (C) a memory, wherein a value corresponding with the multiple print shop cells to be used in forming the print shop configuration is stored in said memory; and (D) a print shop configuration development manager communicating with said memory and including an application, said print shop configuration development manager and said application functioning cooperatively to (1) generate a list of two or more possible print shop configurations that could be formed with the multiple print shop cells to be used in forming the print shop configuration and least some of the pieces of equipment from both the second set of multiple pieces of equipment and the third set of multiple pieces of equipment, (2) determine whether a first one of the two or more possible print shop configurations is substantially equivalent to a second one of the two or more possible print shop configurations, and (3) when said equivalency exists, categorize (a) one of the first one of the two or more possible print shop configurations and the second one of the two or more possible print shop configurations as belonging to a first group of possible print shop configurations and (b) another one of the first one of the two or more possible print shop configurations and the second one of the two or more possible print shop configurations as belonging to a second group of possible print shop configurations.

The above described features, along with other features described below, will become more readily apparent to those of ordinary skill in the art by reference to the following detailed description and accompanying drawings.

FIG. 3 illustrates a table including job data associated with a print shop for use in evaluating print shop consolidation options in accordance with an embodiment;

FIG. 4 illustrates a table including maximum daily initial takt-rate for black and white printing calculated based on the job data of FIG. 3;

FIG. 6 illustrates a table of job data of FIG. 2 but with the due dates offset to take into account transportation delay in accordance with the embodiment;

FIG. 7 illustrates a table of modified takt-rate for black and white printing calculated using the job data of FIG. 6;

FIG. 8 illustrates a table of black and white printing takt-rate for processing jobs at various print shop locations shown in FIG. 1 that require transportation from the shop of origination to the shop of production;

FIG. 9 illustrates a table of required takt-rate results for consolidating into Shop1 and Shop2 of FIG. 1 based on takt-rates taken from FIG. 8;

FIG. 10 illustrates a table of required takt-rate results for consolidating into Shop1 and Shop2 of FIG. 1 based on takt-rates taken from FIG. 8;

FIG. 11 illustrates a table of required takt-rate results for consolidating into Shop1 and Shop3 of FIG. 1 based on takt-rates taken from FIG. 8;

FIG. 12 illustrates a matrix of required takt-rate capacities for various possible options of consolidating the three print shops of FIG. 1;

FIG. 14 is a block diagram illustrating how the disclosed embodiments relating to print configuration formation is used in the context of print shop consolidation;

FIG. 15 is a block diagram depicting a configuration management system for a document factory, such as a print shop;

The following description of exemplary embodiments is directed to an approach for developing configurations in a print shop environment. However, it should be understood that the principles and techniques described herein might be used in other document production-related environments such as mailrooms, document scanning centers and the like.

For the purposes of discussion hereinafter, a "print shop" refers to a grouping of printing resources. The print shop may be a freestanding entity such as a commercial printer or may be part of a corporation or other entity. A "print job" refers to a logical unit of work that is to be completed for a customer. For example, a request to make 10 copies of a book is a print job. Similarly, a request to make 100 copies of a single document is a print job. A production function can be any operation or processing step involved in the processing of the print job. For example, a production function can be black & white printing, color printing, scanning, or packaging.

Figure 1:
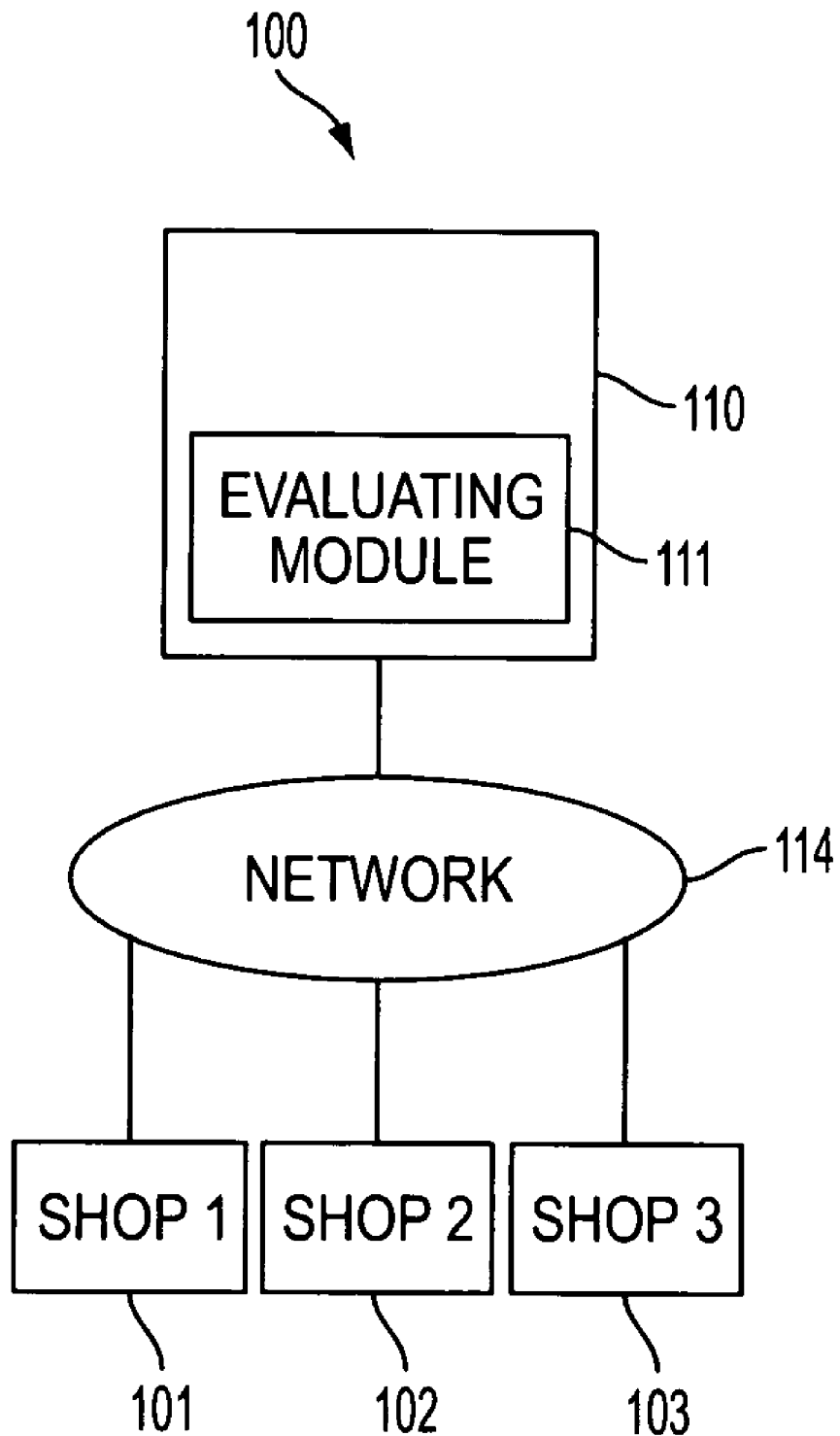
FIG. 1 illustrates a management system implemented on a computer for evaluating print shop consolidation options in an enterprise together with three print shops prior to consolidation in accordance with an embodiment.

Referring to FIG. 1 of the accompanying drawings, a management system 110 for evaluating options of consolidating distributed print shops 101, 102, 103 in an enterprise is shown. A suitable environment 100 for practicing the illustrative embodiment might include a management system 110 implemented on an electronic automated system. For example, the management system could be implemented on a stand-alone computer system, such as a workstation, or on a networked computer.

Those skilled in the art would understand that the illustration of FIG. 1 is merely depicting one example of the embodiments and that the embodiments are not limited thereto. As will be discussed in more detail below, the enterprise can have more than or less than three print shops. The management system 110 of FIG. 1 is operatively coupled, for example via a data network 114, to equipment, such as computers, located at the print shops, 101, 102, 103. However, a skilled person in the art would know that the management system need not be so operatively coupled for the purpose of obtaining data from the print shops. The management system may include a module 111 which is responsible for evaluating the consolidation options. The module 111 may be in the form of software or hardware. The module can be run locally on the management system or run from a remote location via a network coupled to the management system. A person skilled in the art would know that there are multiple modes of implementing such a module.

Figure 2:
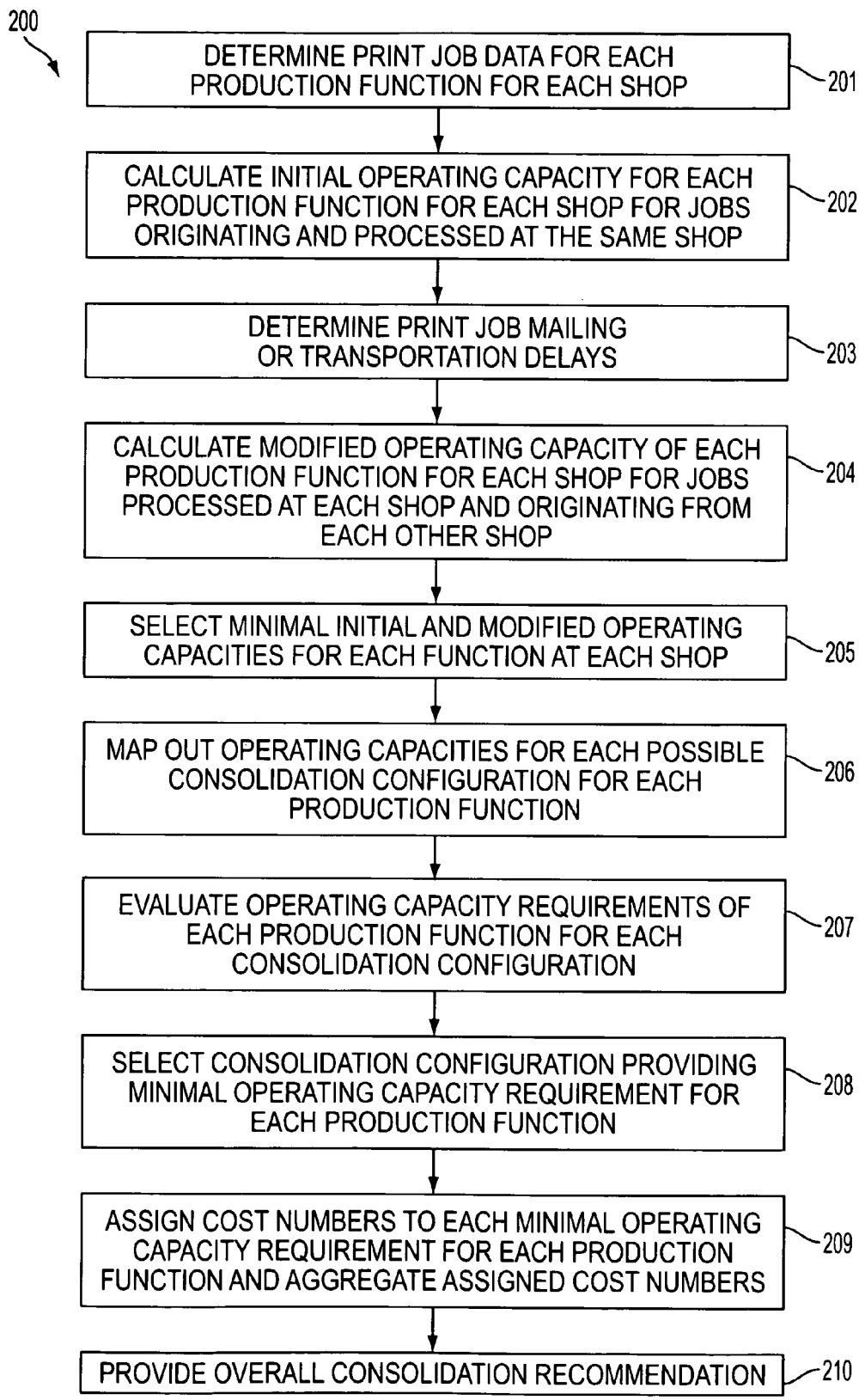
FIG. 2 illustrates a flow-diagram outlining steps which are performed in evaluating print shop consolidation options in an enterprise in accordance with an embodiment.
Figure 5:
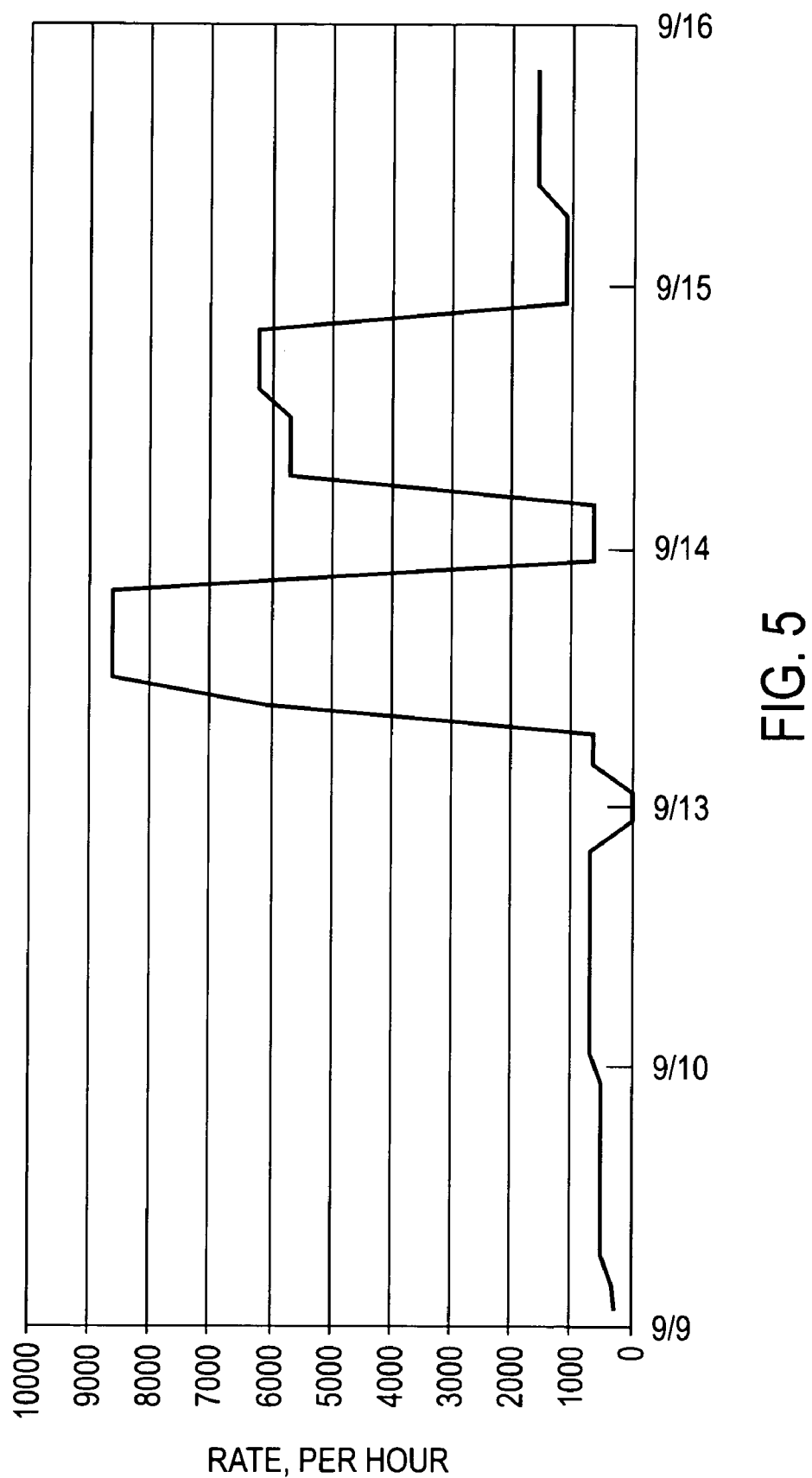
FIG. 5 illustrates a graph of takt-rate as a function of work days for the black and white printing for job data of FIG. 3.

FIG. 2 provides an overview of the steps which are performed in evaluating print shop consolidation options of the enterprise in the illustrative embodiment. Initially, the distributed print shops are identified and job data for each production function for each shop is determined (step 201 of FIG. 2). The job data represents a list of jobs and their characteristics, that is, the job arrival and due dates for each job, the production functions for processing each job and the number of impressions required to be produced by each production function for processing each job. Examples of job data for print shop 101 are shown in the form of a table in FIG. 3. The job data is determined by receiving the data at the management system 110. Alternatively, the job data can be estimated by the management system itself. Thereafter, the operating capacity of each production function in a given work period at each shop is estimated by the management system based on the scenario that all jobs that originate at each shop are processed at the same shop (step 202 in FIG. 2).

In this embodiment, the operating capacity is represented by the takt-rate TRi for each working day for each production function. In order to appreciate how the takt-rate is calculated, is useful to consider the following parameters. If there are n jobs $J_i$ and each job has an arrival time of t_arr$_i$ and a due date of t_due$_j$. Each job also has a production quantity $q_i$ associated with each processing step or production function where the processing step belongs to a set of workstations W with element $w_i$ with a processing rate of $r_i$. (A value of 0 for $q_i$ for some i implies that there is no processing associated with the workstation). The takt-rate $TR_i(t)$ (units required to be produced per unit time) on each workstation at any time t is therefore:

$$TR_i(t) = \sum_{i=1}^{n} \frac{q_i(t)}{t\_due_i - t\_arr_i} \quad (1)$$

where $q_i(t) = q_i$ if $t\_arr_i < t < t\_due_i$ and $q_i(t) = 0$ otherwise

As an example, the total takt-rate for each working day for a particular production function, in this case, black and white printing, estimated by the management system 110 using the job data of FIG. 3, is shown in FIG. 4. Similar calculations of takt-rates can be preformed for the other production functions, nbooks, color printing, scanning and packaging referred to in the job data of FIG. 3.

If consolidation of print shops from multiple locations to fewer locations is to take place, it is necessary to take into account the scenario in which jobs may originate at one particular print shop 101, 102, 103 and then may be sent to a different print shop 101, 102, 103 for processing. Sending the jobs to another shop delays production. Consequently, the operating capacity associated with each production function at each shop increases. The initial calculated operating capacity therefore has to be modified to take into account the scenarios in which the print jobs originate at each print shop and can be transported to each other print shop for subsequent processing of the print job at each other shop.

To this end, the mailing or transportation times for sending jobs originating from each shop to each other shop for processing are received or estimated by the management system 110 (Step 203 of FIG. 2). The system subtracts these delay times from the corresponding original due times to take into account the sending delays. The modified operating capacity for each production function at each shop is estimated by the system using the new due times (step 204 of FIG. 2). For example, if jobs listed in FIG. 3 originating at first shop 101 are to be processed at a second shop 102 and the transportation time is 1 hr, then the total modified takt-rates for each production function at shop 102 for jobs originating from shop 101 for each working day estimated by the system will be as shown in the table of FIG. 6.

The maximum initial and modified takt-rates for each production function during a predetermined time interval are then calculated by the system (step 205 of FIG. 2). For example, from FIG. 4, the maximum black and white printing initial takt-rate requirement during a working week is 8625 impressions/hr and from FIG. 7, the maximum black and white printing modified takt-rate requirement during a working week is 10862 impressions/hr. If necessary, some other predetermined time interval can be selected or, alternatively, the takt-rates can be chosen based on criteria other than a maximum over a given period.

Using these analyses, configurations of consolidating a number of print shops into a few numbers of shops can be determined and the estimated maximum takt-rate for each production function for each configuration can be mapped out for each consolidation configuration (step 206 of FIG. 2). Accordingly, a takt-rate matrix $T_{ij}$ can be computed by the system where the $ij^{th}$ element denotes the maximum takt-rate for the scenario where all the jobs that have originated at shop i are processed at shop j. To illustrate this step, reference will now be made to the example of FIG. 8 which illustrates a matrix of maximum black and white printing takt-rates for jobs originating and processed at the three shops 101 (Shop1), 102 (Shop2), 103 (Shop3) of FIG. 1 and for jobs requiring transportation from each print shop 101 (Shop1), 102 (Shop2), 103 (Shop3) for processing at each other print shop 101 (Shop1), 102 (Shop2), 103 (Shop3). The row of indications Shop1, Shop2 & Shop3 at the top of the matrix represent shops of job production whereas the column of indications Shop1, Shop2 & Shop3 at the side of the matrix represents shops of job origination.

Thereafter, the system 110 determines the minimum operating capacity requirement for each consolidation configuration to evaluate the options of consolidating a number of print shops 101, 102, 103 into fewer consolidated shops (step 207 of FIG. 2). To illustrate this step, reference is once again made to the example of the matrix of FIG. 8. Suppose it is necessary to determine the consolidation options for the case in which the 3 shops 101 (Shop1), 102 (Shop2), 103 (Shop3) are to be consolidated into 1 location. The maximum production takt-rate for the situation will be evaluated when the shops are collocated at each of one of the three locations. Therefore, if all shops are consolidated into 1 location which happens to be shop 101 (Shop1); then the total takt-rate for black and white printing is (8625+10386+6633)=25644 impressions/h. If the shops are consolidated at 102 (Shop2) the total takt-rate is (10862+9078+3379)=23319 impressions/h. Similarly, the result of consolidation at 102 (Shop2) is 27400 impressions/h. Therefore the best option is to consolidate at location 102 (Shop2) since it gives the minimum takt-rate for the enterprise.

In order to evaluate the consolidation options when the shop consolidation occurs at 2 shops, options of consolidation at 101 (Shop1), 102 (Shop2) or 102 (Shop2), 103 (shop3) or 101 (Shop1), 103 (Shop3) are evaluated by the system. For the situation of consolidating into two shops 101 (Shop1) and 102 (Shop2), it is assumed that all jobs should be performed at the shop with lowest takt-rate. Therefore according to FIG. 8, all jobs at 101 (Shop1) will be performed at 101 (Shop1) because the lowest takt-rate is 8625 and occurs at 101 (Shop1). Similarly, since jobs that originate from 102 (Shop2) can be processed at 102 (Shop2) at a lower required takt-rate than if they are processed at 101 (Shop1), the jobs originating from 102 (Shop2) are assigned to 102 (Shop2) for processing. Similarly, the jobs originating at 103 (Shop3) are better allocated to 102 (Shop2) because takt-rate required to process the jobs is lower if they are process at 102 (Shop2) than if they are processed at 101 (Shop1). The result of this allocation of job capacity to shops 101 (Shop1) and 102 (Shop2) leads to a total capacity allocation of 21082 impressions/h for the Black and White printing production function as shown in FIG. 9.

Matrices and total capacity allocations for the other two possible consolidation options of consolidating the three shops into consolidated shops 102 (Shop2) and 103 (Shop3) and into consolidated shops 101 (Shop1) and 103 (Shop3) are shown in FIG. 10 and FIG. 11, respectively.

Referring to FIG. 12, which illustrates a chart summarizing the takt-rate requirement for the various consolidation options, clearly, in this example, the takt-rate (and hence required capacity) for black and white printing is minimized by choosing the option of consolidation at print shop 101 (Shop1) and 102 (Shop2).

A similar analysis can be performed for other production functions such as Color Printing. The capacity requirement can be mapped to a cost number and then various cost numbers for each function including costs of facility, labor and other related items can be aggregated into a single cost number for each option (Step 209 of FIG. 2). This can be sorted to provide an overall consolidation recommendation (Step 210 of FIG. 2).

It is possible to extend the example given above to a more general case where there are a total of n number of print shops to be consolidated and k (<n) number of desired shops after consolidation. In order to appreciate how the system 110 determines all possible consolidation configurations in such a general case, it is useful to express the total number of possible configurations $P_k$ to consolidate n shops to k shops as follows:

$$P_k = C_n^k \cdot k^{n-k} \text{ where } C_n^k = \frac{n!}{(n-k)!k!} \quad (2)$$

The total number of possible configurations P to consolidate n shops regardless of how many consolidated shops will be produced can be expressed as follows:

$$P = \sum_{k=1}^{n-1} (C_n^k \cdot k^{n-k}) \quad (3)$$

Figure 13:
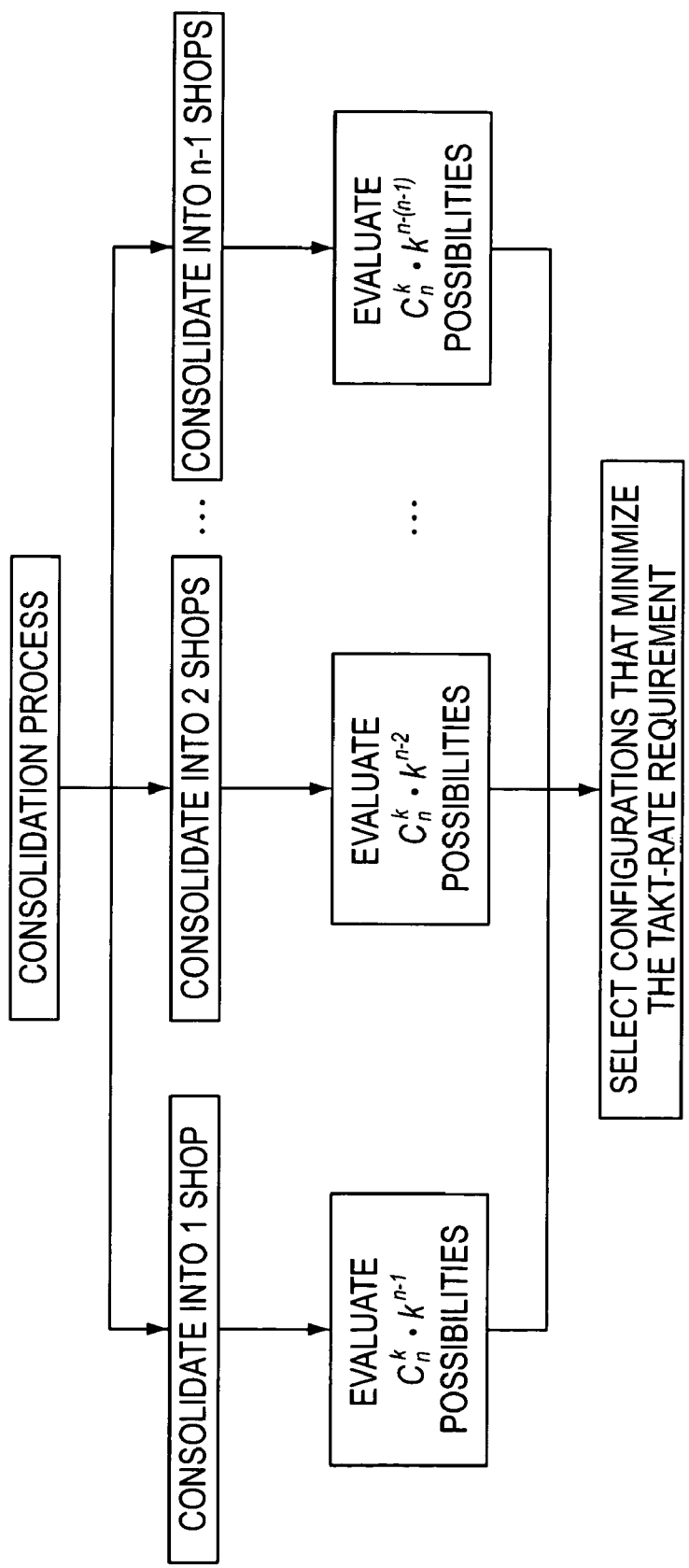
FIG. 13 illustrates a block diagram outlining general consolidation process modules of determining the required minimal takt-rates for each production function for all possible consolidation options irrespective of the number of consolidated shops.

FIG. 13 illustrates a block-diagram of operational modules of the consolidation process for the more general case. In order to determine the best consolidation options, it is necessary to search for configurations that have the minimal Takt rate through all P possible configurations.

FIG. 14 relates, in general, to the development of print shop configurations in the context of print shop consolidation. The illustrated embodiment of FIG. 14 corresponds with an example in which the job processing of five target sites (Shop1, Shop2, Shop3, Shop4 and Shop5) are consolidated into two target sites (Shop1 and Shop2). Pursuant to such consolidation, jobs from Shop3 (J3) and Shop4 (J4) are communicated (physically or electronically) to Shop1, while jobs from Shop 5 (J5) are communicated (physically or electronically) to Shop5. It will be appreciated that the example of FIG. 14 could be varied in a substantial number of different ways. For instance, the number of source sites could be any number greater than or equal to two, while the number of target site(s) could be any number greater than or equal to one. Additionally, depending on a number of factors discussed in the above-mentioned U.S. patent application Ser. No. 11/185, 202, the communication of jobs could be routed in a number of different ways other than that shown in the example of FIG. 14.

Once the target site(s) has been set, a print shop designer would, in one example, designate the number of cells (C1-C5 in FIG. 14) to be used in developing the consolidated print shop configuration (CPSC) for the target site(s). As shown in FIG. 14, each one of the source sites is associated with an equipment or station set ($S_{Shop(i)}$), where each set includes one or more pieces of equipment. It follows, for the example of FIG. 14, that some or all of the equipment from five equipment or station sets, namely $S_{Shop1}$, $S_{Shop2}$, $S_{Shop3}$, $S_{Shop4}$, and $S_{Shop5}$ are available for use in populating cells C1-C5. should be recognized that the cells can be populated with some or all of the equipment from the source sites. As contemplated by the description below, pieces of equipment from the equipment sets are linked with the cells to form the CPSC in accordance with the described approaches disclosed below.

Further description of basic print shop configuration development is provided in the above-mentioned U.S. patent application Ser. No. 09/706,430 by Rai et al. As indicated by the '430 Patent Application, configuration resources, such as printers, copiers, cutters, shrink-wrappers and other varieties of equipment, may be partitioned into autonomous cells to form a print shop configuration. When a print job arrives, it may be assigned to a particular autonomous cell for completion. Each autonomous cell may act independently from the other autonomous cells in processing a print job. Print jobs may be partitioned into smaller-sized lots that are concurrently processed by autonomous cells in order to optimize the efficiency and throughput of each autonomous cell. Moreover, multiple print jobs may be processed concurrently by an autonomous cell, and multiple print jobs may be executed concurrently by multiple autonomous cells in parallel.

Print shop resources may be intelligently divided into autonomous cells. An analysis is made of print jobs that are typically performed by a print shop. Each type of print job is classified into a print job class according to the resources required to execute it. A print job class may be depicted graphically as a set of operations that are connected by edges representing the sequence of flow of operations in the print job. The capacity of each of the pieces of equipment or stations in the print shop to perform operation is determined. The capacity for each print job class needed to meet the customer requirements is determined. The print shop resources may then be organized into autonomous cells and used during operation in an optimal fashion.

As evidenced by U.S. Pat. No. 7,051,328 B2 to Rai et al., the pertinent portions of which are incorporated herein by reference, and U.S. patent application Ser. No. 10/052,505 by Rai et al. (filed on Jan. 11, 2002 (published as 20030149747 on Aug. 7, 2003)), the pertinent portions of which are incorporated herein by reference, a suitable server (designated with the numeral 10 in FIG. 15) can be used to coordinate production of document processing jobs in a document factory (such as a print shop—designated by the numeral 12 in FIG. 15), and exploit production techniques to control document processing jobs. The server can be run on a number of different platforms, including but not limited to UNIX, Windows or Window NT based-platform, such as a server computer system. The server, being operatively associated with a suitable amount of memory 14 (FIG. 15), determines workflow priorities and manages workflow accordingly. It should be understood that "memory," as that term is used herein, refers to all forms of storage, including volatile as well as non-volatile memory. Moreover, as contemplated, the memory includes all forms of memory that can be associated with the server, including portable and non-portable forms of memory. Finally, the server can, with inputs regarding cell number and equipment types (from, for instance, the CPSC from FIG. 14) develop a print shop configuration in accordance with the framework described below with respect to FIGS. 16-19.

As follows from the description above-mentioned with respect to U.S. patent application Ser. No. 09/706,430 by Rai et al., sound document production principles can be employed to configure print shops so that flows and efficiencies are acceptable.). It will be appreciated by those skilled in the art of production design that the term "flow" is sometimes associated herein with volumetric rate. However, it should be understood that generating or developing print shop configurations, such that efficiency and job scheduling is optimized, can present a significant problem. In particular, the ways in which equipment can be combined in a print shop to make a cellular system may be expressed as:

$$(C+1)^S$$

where, C is the number of cells and S is the number of unassigned stations (or equipment types)

The "+1" represents the fact that a station can be in a cell or unassigned. Thus, if a shop contains eighteen pieces of equipment and is expected to have three cells, then the number of potential shop configurations is $4^{18}$.

As described in further detail below, one of the disclosed embodiments relates to an approach for determining an optimum print shop configuration by searching (and thereby listing) all potential configurations for a given print shop, and using a selected criterion for determining the optimal one of the potential configurations. It should be appreciated that, in some instances, it may be desirable to use a criterion that includes a combination of two or more criteria. A print shop configuration designer ("user") may wish to constrain the configuration search by (1) determining maximum cell count, and (2) choosing to associate selected pieces of equipment with certain cells. By constraining the search, the user can reduce the number of equipment combinations required, and reduce the search space employed. As will appear, the user determines the criterion on which each configuration will be judged. Some examples of potential criteria include:

Late jobs percent
Average Earlyness
Average Lateness
Averae PCE
Average Turnaround Time (TAT)
Average VAT
Average PRT
Average Station Utilization
A Cost Factor including a Weighted Rating (with multiple criteria)

Before proceeding with a description of an application for determining an optimum print shop configuration, it would be helpful to understand two theoretical approaches underlying such application. In the first theoretical approach, searching technique is improved by reducing the number of configurations considered through eliminating equivalent print shop configurations, and in the second theoretical approach, searching technique is improved by reducing the number of configurations considered through eliminating irrelevant print shop configurations.

Referring initially to the first theoretical approach, the stations in a cell of a print shop are each capable of performing one or more functions at a rate known as the throughput. Each job requires one or more functions, and it is likely that many jobs processed in a print shop can be grouped in sets requiring the same, or at least common, functionality. A vector, representing common functionality, may be constructed, and each component of the vector may correspond to a function.

If the functionality vector (see below) represents the functionality present in a cell, then the magnitude of the component in the vector is equal to the sum of the throughputs of all of the machines in the shop that are capable of providing that functionality.

$$\vec{C} = (C_1, C_2, \ldots, C_k)$$

where, C is the vector representing the functionality of the cell in the vector space defined by the functionality in the shop.

Each function in the print shop is a different dimension in the vector space, and the magnitude of C in any given direction k corresponds to the throughput of the function (k) in that cell C. Thus, $C_k$ is the sum of the throughput of all machines that can perform functionality "k" in the cell represented by the vector C. Accordingly, in order to determine whether two print shop configurations are essentially equivalent, it is sufficient to compare the vectors that represent their functionality, component by component. If the magnitude of each component of the two vectors differs by less than some tolerance (possibly around 10%), then the two print shop configurations may be considered to be functionally equivalent.

Cell configurations can be grouped together on the basis of equivalency. After an optimum group is determined, each configuration in its group will be analyzed to determine how to optimize within the group. For purposes of determining optimum cell configuration, only one configuration per group need be analyzed. Determining which member of the group to analyze is an ill-defined problem because it is difficult to predict, a priori, which member of the group is most representative (or best performing). Therefore, pursuant to the description of the application below, it will be assumed that the tolerance is set in such a manner that performance of all members of the group is roughly similar. Accordingly, which member of the group is simulated becomes unimportant.

The second theoretical approach uses the theoretical underpinning of the above-described functionality vector in conjunction with a job requirement related vector. In particular, if the functionality vector represents a print job, then the magnitude of the component of the vector represents the quantity of work required by that job from that functionality, $$\vec{J} = (J_1, J_2, \ldots, J_k)$$

where, J is the vector representing the functionality requirements of the job and $J_k$ is the specific requirement of functionality "k".

As contemplated by the disclosed embodiments, determining whether a given print shop configuration is relevant can be achieved by comparing the functionality vector of each cell in a print shop with each job to be printed at the shop. Comparing a cell to a job may be done without respect to throughputs, i.e., to the magnitudes of the vector components. Rather, the comparison can simply focus on whether the cell has the functionality to produce the job, i.e., a nonzero magnitude for any component of the vector. Various criteria for "relevancy" are contemplated. For instance, a cell might be deemed relevant if it were capable of printing either (1) one of the most common jobs processed at a given shop, or (2) some fraction of the total jobs processed at the given print shop. As will be appreciated by those skilled in the art, various other criteria, in which requirements for a job are compared with the functionality of a cell, could be employed. The jobs selected for comparison might include, for instance, a preset number of jobs (e.g., five jobs) processed most by the shop or a selected percentile (e.g. top 20 percentile) of jobs processed by the shop. The types of jobs processed can be ordered by "flow", pages, or some other objective criterion.

In the disclosed embodiments, relevancy is assessed on a cell-by-cell basis even though many encountered configurations include multiple cells. It follows that the relevancy of a given configuration might hinge on either the (1) relevancy of each cell associated with the given configuration, or (2) collective relevancies of the given configuration's associated cells. While the approach disclosed herein considers the relevancy of each cell in determining relevancy of a given configuration, the disclosed embodiments also contemplate an approach in which collective relevancies of a given configuration are used to determine configuration relevancy.

Referring now to FIGS. 16-19, concepts applicable to the development of an optimal print shop configuration are shown in the form of a series of flow charts. As will be appreciated by those skilled in the art, these concepts can be readily implemented with the server 10 of FIG. 15 (the server also being referred to herein as a print shop configuration manager ("manager")). Referring first to 300 in FIG. 16, the manager can, based on input regarding the number of cells (C) desired and available equipment or stations (S), enumerate or generate a list of all possible print shop configurations. Prior to enumeration, a station can be either allocated (i.e., designated for use in one or more of the available cells) or unallocated. To the extent a station is allocated, the number of possible print shop configurations will be reduced in number.

As mentioned above, the number of possible configurations can be very large. Hence, prior to assessing which configuration might be optimal for a given print shop setting (FIG. 19), one or two subroutines can be employed (via the flow charts of FIGS. 17 and 18) to significantly reduce or prioritize the list of possible print shop configurations (hereinafter referred to simply as "list"). In one embodiment, at 302, the configuration development process branches of to relevancy analysis subroutine. Pursuant to branching off to the relevancy analysis, the list of possible configuration is made available.

Figure 17:
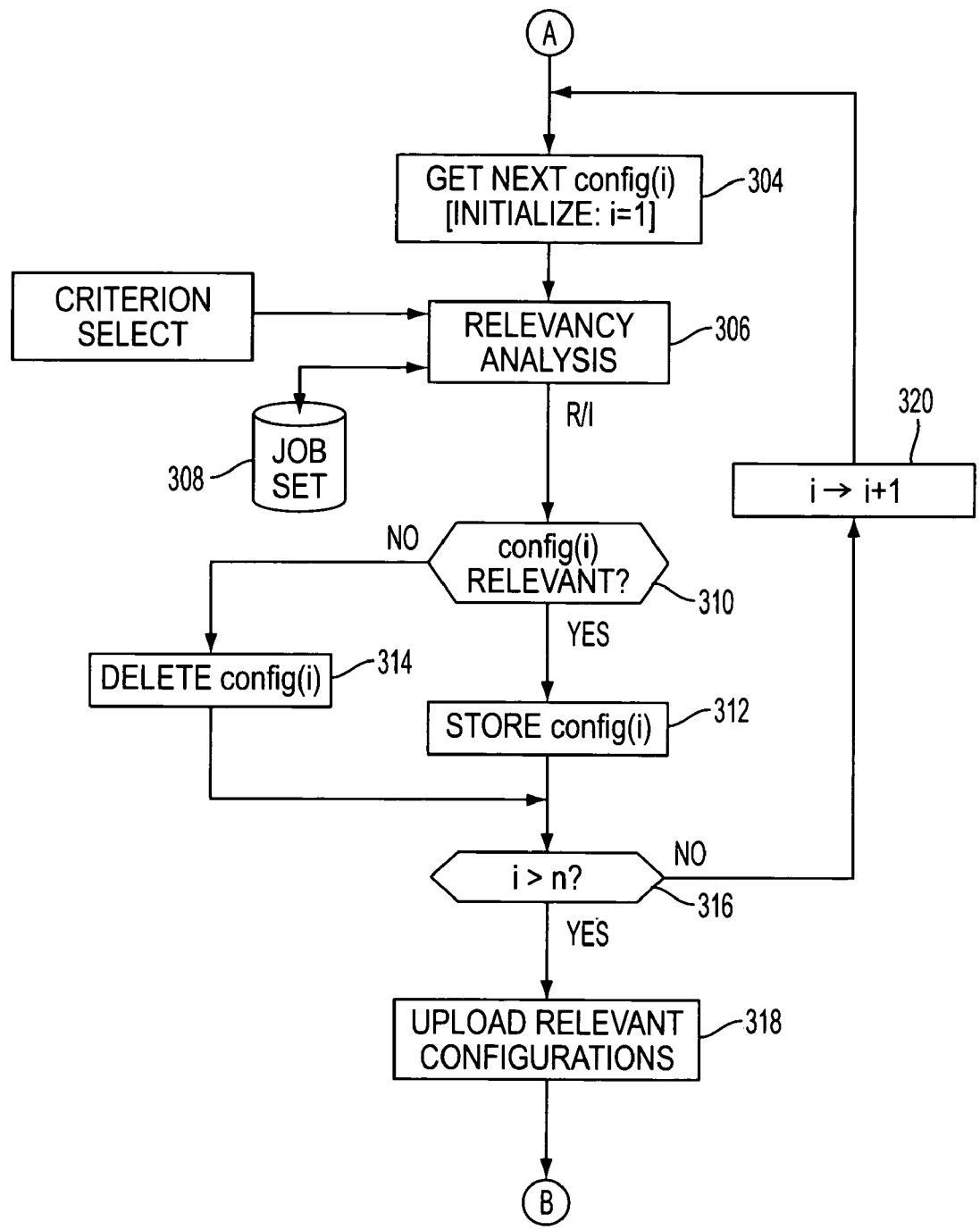
FIG. 17 is a flow chart illustrating a relevancy determining process used in the context of obtaining a job processing configuration.

Referring specifically to FIG. 17, a parameter, designated as "config(i)" is initialized, at 304, to correspond with the first entry in the list. As is common, "i" serves as an index for the list so that i=1 for the first configuration entry in the list, i=2 for the second configuration entry in the list, and so on. Initially config(1) is communicated to a relevancy analysis process 306. As contemplated, all of the components necessary to analyze relevancy are brought together and considered at the process. In one example, the process 806 generates functionality related information (in the form of C vectors) in accordance with the description above.

The process 306 also has access to inputs such as a "Job Set 308." The Job Set includes all necessary information relating to job types encountered at a given print shop. At least some of the information may be obtained by surveying print shop consumers, or directly from shop job logs. In practice, the process 306 may be further provided with, among other things, a performance requirement, such as flow, pages printed, or some other quantity. In one example of operation, the process 306 ranks the job types for the given print shop based on the performance requirement of the job in order to determine the highest volume of jobs produced by the shop. As will be appreciated, depending on particular requirements of shop consumers, other metrics besides print production may be used as a criterion for determining relevancy.

As should now appear, the process 306 is capable of generating job requirement related information in the form of one or more J vectors. Using the C and J vectors, the process, in one example, compares each cell to each job type to determine whether the cell is "relevant." In this way, the process determines, for each cell, whether it can produce one of the most common job types produced by the shop as a whole. Put simply, if a given set of one or more cells can process a given set of one or more job types in a pre-selected manner, then the configuration corresponding with the given set of one or more cells is deemed relevant. After determining whether a configuration (with its associated cells) is relevant (R) or irrelevant (I), an answer of R or I ("R/I") is provided to sorting function 310.

If the configuration currently under consideration is relevant, then it is stored via 312; otherwise, the same configuration is deleted at 314. At 316, the current position of the index i is checked to determine if the last configuration has been considered. If the last of n configurations has been considered (so that i>n), then the relevant configurations may be uploaded (via 318) for use in the main routine of FIG. 19 (i.e., the relevant configurations are made candidates for evaluation); otherwise, the index is increased by 1 (320) so that the next configuration can be retrieved at 304 and analyzed at 306.

Figure 16:
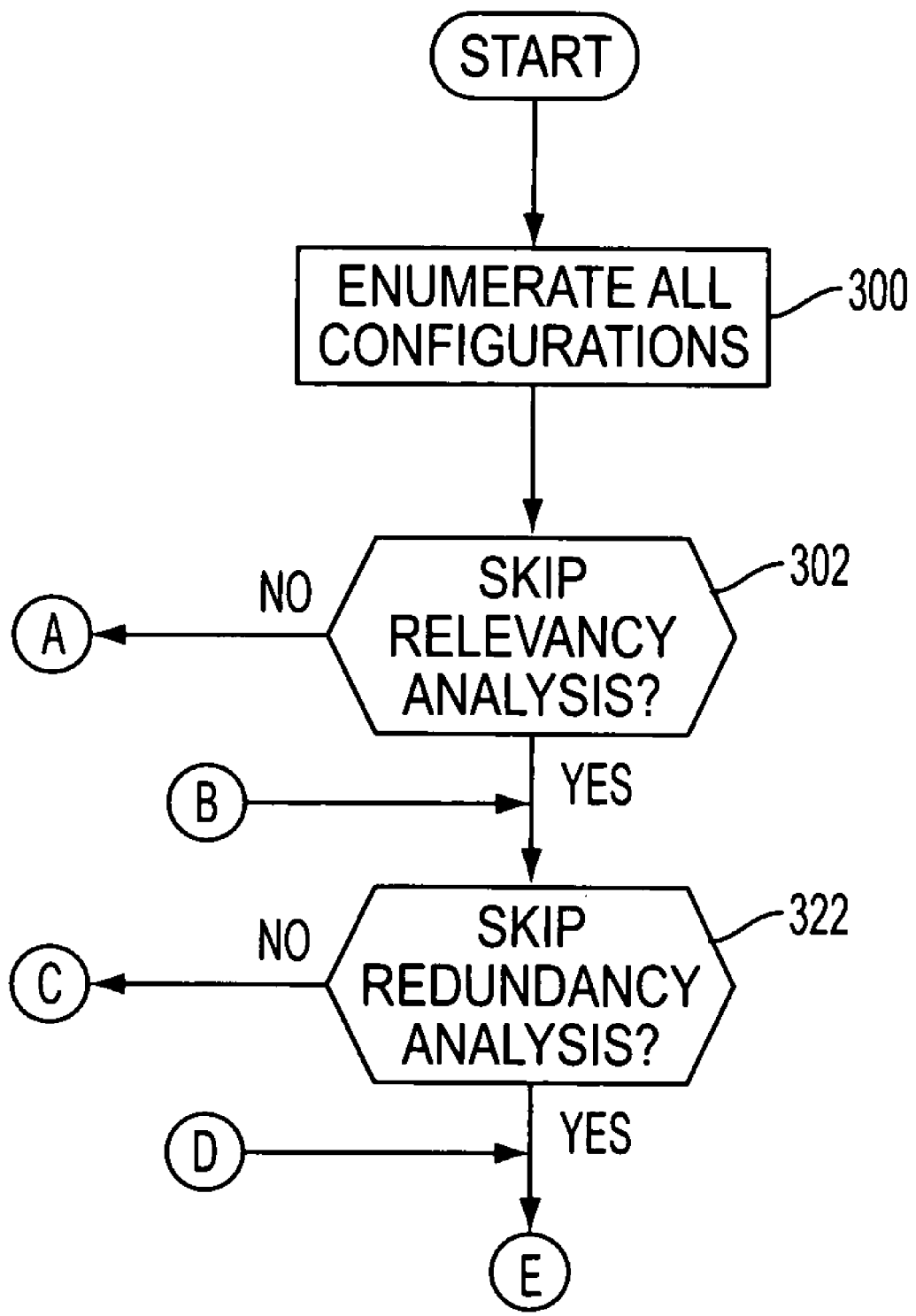
FIG. 16 is a flow chart illustrating steps employed in accessing processes, the processes being used to obtain a job processing configuration.
Figure 18:
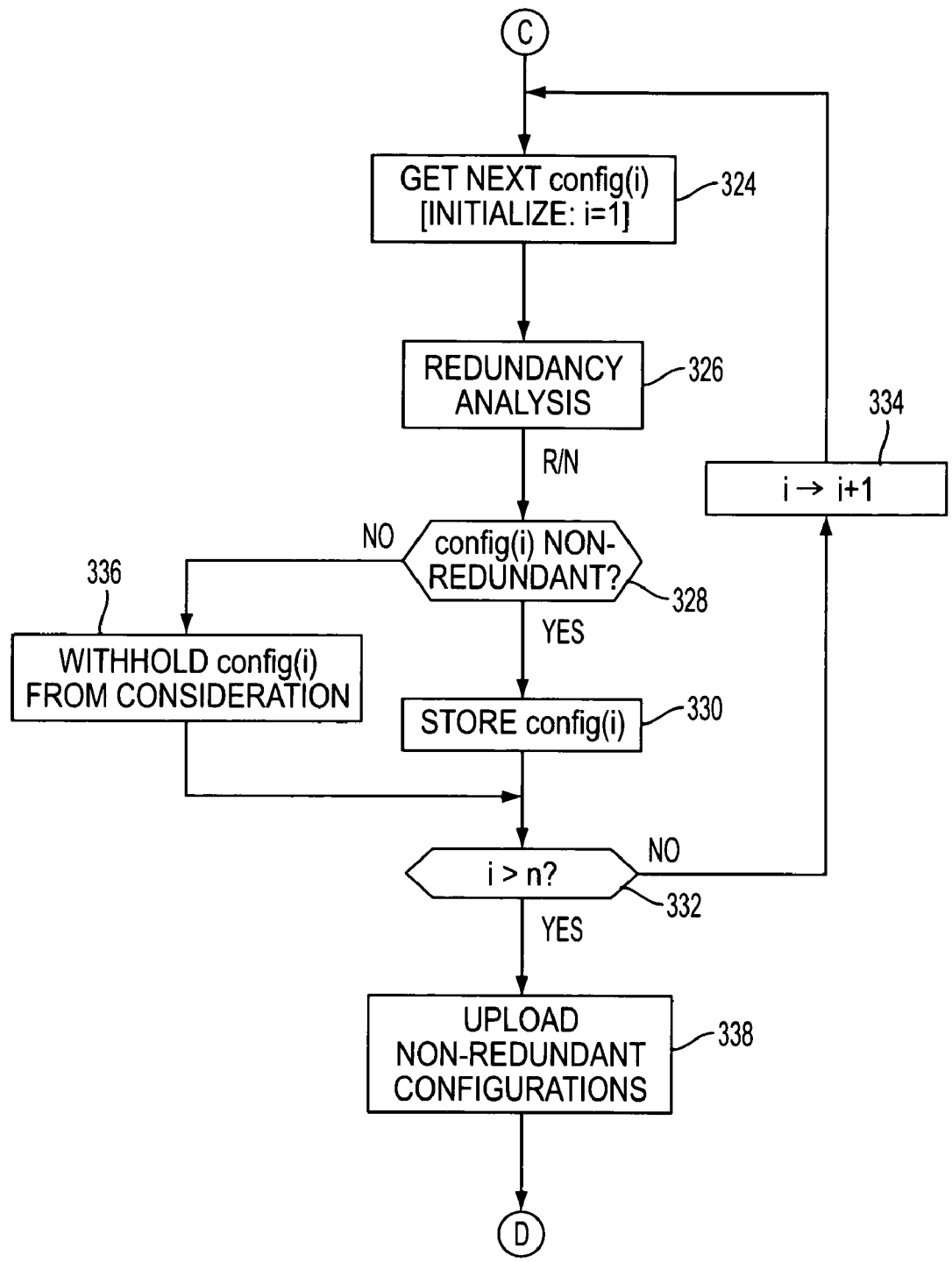
FIG. 18 is a flow chart illustrating a redundancy determining process used in the context of obtaining a job processing configuration.

Returning again to FIG. 16, the need for a redundancy check is considered at 322. Referring to FIG. 18, if a redundancy check is desired, then the process branches to 324. Referring conjunctively to FIGS. 17 and 18, the step at 324 is similar to that at 306, retrieving configuration related information (i.e., information corresponding with "config(i)") sequentially from the list generated at 300 (FIG. 16). Initially config(1) is communicated to a redundancy analysis process 326. As contemplated, all of the components necessary to analyze redundancy (R) and non-redundancy (N) are brought together at the process 326. In one example, the process 326 is capable of generating cell related information for each configuration, in the form of one or more C vectors.

For the initial configuration (config(i)), the process 326 returns a non-redundancy (N) indicator, so that the information is directed from the sorting function 328 to the storage function 330. After storing the information at 330, a check is performed at 332 to determine if all of n configurations have been assessed for redundancy. Assuming the current configuration is not the $n^{th}$ configuration, then the index is increased by 1 (334), and further information regarding the next configuration is obtained at 324.

For a current configuration in which i>1, the redundancy process compares the functionality vector of the current configuration to stored information from each previously considered configuration, in accordance with the description above. In one instance, the process 326 determines which shop configurations are equivalent to each other by determining that they have similar (to within some tolerance) rates of production of the functionalities of each of their cells. As can be understood, since configurations from the above-mentioned list are being compared to one another, it is desirable to save information about each configuration after it has been considered for redundancy. It follows that the saved information can be purged once all of the possible configurations on the list have been considered. Additionally, each redundant configuration may be withheld from consideration (via 336) and non-redundant configurations can be uploaded (338) for use by the routine of FIG. 19 (i.e., the non-redundant configurations are made candidates for evaluation). It should be further noted that, in one exemplary implementation, non-redundant configurations might be placed in one group, while redundant configurations might be placed in another group. In accordance with the description above, selected configurations from the redundant configuration group could then be evaluated (via the routine of FIG. 19) along with possible configurations of the non-redundant configuration group.

Figure 19:
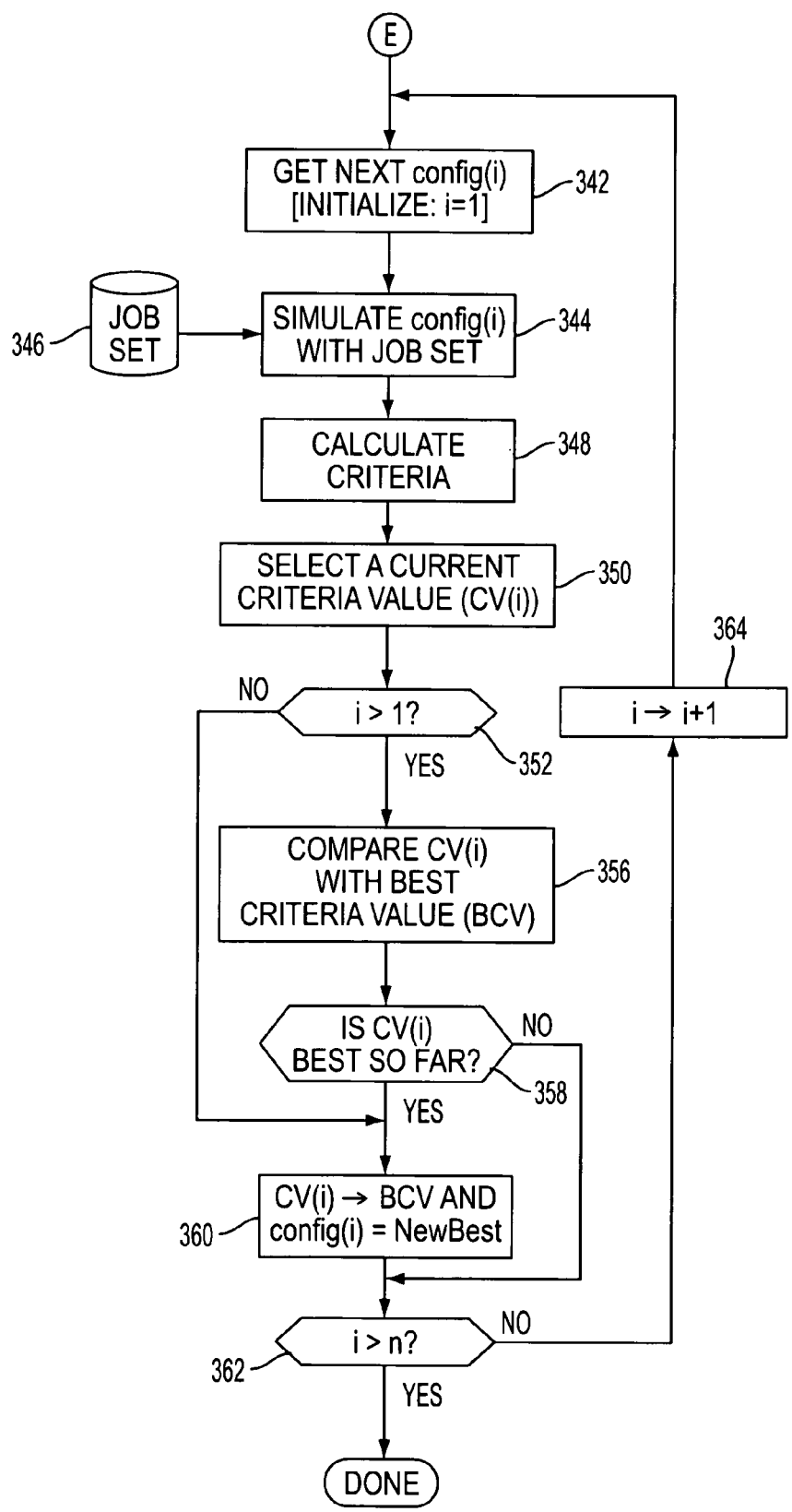
FIG. 19 is a flow chart illustrating process used in obtaining a job processing configuration.

Referring now to FIG. 19, unfiltered or filtered configurations (filtered for relevancy and/or redundancy) may be introduced sequentially at 342. Initially, a simulation of the first configuration (config(1)) is performed at 344 for each job of the job set 346. It should be appreciated that the job set 346 does not typically include all types of jobs executed in a given print shop. In one example, the jobs would merely be representative of those types of jobs commonly processed in the given print shop. As mentioned above, the commonly encountered job types can be obtained from, among other sources, consumer surveys or print shop logs.

After simulating the full job set (i.e., after performing a "complete simulation" for the configuration under consideration), one or more criteria is calculated, at 348, for the current configuration. In one example, one of the calculated criteria may relate to job processing time and, in another example, one of the calculated criteria may relate to resource (factory) utilization or cost. A comprehensive discussion relating to the types of data generated in a document production environment (and hence available criteria) is provided in U.S. patent application Ser. No. 10/946,756, filed Sep. 22, 2004, by Duke et al., Publication No. 20050065830, published on Mar. 24, 2005, the pertinent portions of which are incorporated herein by reference.

Responsive to user input (not shown), at 350, a current criterion value (CV(i)) (from calculated criteria values) is selected. User input may be obtained prior to the examinations of the enumerated configurations, and it is understood that, in practice, the user would choose a criterion type (such as TAT), rather than any particular value. A check at 352 takes into account that CV(1) is initially the best criteria value (BCV) encountered thus far, and that the corresponding configuration is the best configuration encountered thus far (Configu(1)=NewBest). Assuming that i>1, then CV(i) is, at 356, compared with the currently stored BCV. Viewed from one perspective, CV(i) serves as a rating of the configuration under question. The current rank of CV(i) under question can then be obtained by comparing CV(i) to the currently stored BCV.

If, as determined with 358, current CV(i) is the best value obtained thus far (e.g., faster processing time or better utilization of resources), then current BCV, at 360, assumes the value of the current CV(i), at 360, and the corresponding configuration is designated as NewBest. Notwithstanding the answer obtained at 358, a check is performed at 362 to determine if n configurations (the number of configuration in the enumerated list) have been considered. If i>n, then the process is done; otherwise, the value of i is increased by 1, at 364, and the next configuration in the list is retrieved for consideration.

The above-disclosed embodiments consider the significance of various selected relationships for the sake of deleting or prioritizing irrelevant/redundant print shop configurations from a list of two or more possible print shop configurations.

The disclosed print shop configuration forming system, in one example of print shop consolidation, combines selected equipment pieces from a second set of equipment (corresponding with a previously configured first print shop), a third set of equipment (corresponding with a second print shop) and a fourth set of equipment (from a third print shop) to form a first set of equipment. In one instance, the first set of equipment corresponds with a newly configured print shop and, in another instance, the first set of equipment may be distributed among two or more print shops (e.g., the first print shop and a fourth print shop).

In one example of a relevancy analysis, the existence of a selected relationship is determined by comparing a first functionality vector (corresponding with one or more job requirement sets) with a second functionality vector (corresponding with one or more print processing related cells). In another example of the relevancy analysis, the existence of selected relationship is determined by reference to either multiple job processing frequencies or the percent of multiple job requirement sets that can be processed with at least one or more print processing related cells.

In one example of a redundancy analysis, the existence of a selected relationship is determined by comparing a first functionality vector (corresponding with a first set of one or more print processing related cells) with a second functionality vector (corresponding with a second set of one or more print processing related cells). In comparing the first and second functionality vectors, redundancy may be deemed as occurring when the first functionality vector differs from the second functionality vector by less than a selected tolerance amount. In another example of the redundancy analysis, job processing simulation may be performed on print shop configurations to determine which of the print shop configurations should be deleted from the list or two or more possible print shop configurations.

It will be appreciated that various ones of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A system for forming a print shop configuration for a first print shop, the print shop configuration being capable of processing print jobs with each print job corresponding with a set of print job processing requirements, comprising:

(A) a first set of multiple pieces of equipment, wherein the first set of multiple pieces of equipment is compiled from a second set of multiple pieces of equipment and a third set of multiple pieces of equipment, the second set of multiple pieces of equipment having been corresponded with the first print shop prior to said compilation, and the third set of equipment having been corresponded with a second print shop;

(B) a set of multiple print shop cells to be used in forming the print shop configuration, each print shop cell being associated with at least one piece of equipment from the first set of multiple pieces of equipment;

(C) a memory, wherein a value corresponding with the multiple print shop cells to be used in forming the print shop configuration is stored in said memory; and (D) a print shop configuration development manager communicating with said memory and including an application, said print shop configuration development manager and said application functioning cooperatively to (1) generate a list of two or more possible print shop configurations that could be formed with the multiple print shop cells to be used in forming the print shop configuration and at least some of the pieces of equipment from one or both the second set of multiple pieces of equipment and the third set of multiple pieces of equipment, (2) determine for one of the two or more possible print shop configurations, whether a selected relationship exists between one or more sets of print job requirements and at least one of the multiple print shop cells to be used in forming the print shop configuration, and (3) delete the one of the two or more possible print shop configurations from the list when the selected relationship does not exist, in which C number of print cells are used with S number of pieces of equipment, wherein the list of two or more possible print shop configurations includes $(C+1)^s$ possible print shop configurations.

2. The print shop configuration forming system of claim 1, wherein a third print shop corresponds with a fourth set of multiple pieces of equipment, and wherein the first set of multiple pieces of equipment is formed by compiling selected pieces of equipment from the second set of multiple pieces of equipment, the third set of multiple pieces of equipment and the fourth set of multiple pieces of equipment.

3. The print shop configuration forming system of claim 2, wherein the print shop configuration also includes a fourth print shop, and wherein said first set of multiple print shop cells are to be distributed across a print shop configuration including both the first and fourth print shops.

4. The print shop configuration forming system of claim 1, wherein the list includes all of the possible print shop configurations that can be formed with said second and third sets of multiple pieces of equipment.

5. The print shop configuration forming system of claim 1, in which multiple job types are processed at a print shop and each one of the multiple job types is provided to the print shop at a job processing frequency, wherein the existence of the selected relationship is determined with multiple job processing frequencies.

6. The print shop configuration forming system of claim 1, in which multiple job requirement sets are compared with at least one of the multiple print shop cells to be used in forming the print shop configuration, wherein the existence of the selected relationship is determined by reference to the percent of multiple job requirement sets that can be processed with the at least one of the multiple print shop cells to be used in forming the print shop configuration.

7. The print shop configuration forming system of claim 1, in which each one of the one or more job requirement sets corresponds with a first functionality vector and the one of the one or more print processing related cells corresponds with a second functionality vector, wherein the existence of the selected relationship is determined by comparing the first functionality vector with the second functionality vector.

8. A system for forming a print shop configuration for a first print shop, the print shop configuration being capable of processing print jobs, comprising:

(A) a first set of multiple pieces of equipment, wherein the first set of multiple pieces of equipment is compiled from both a second set of multiple pieces of equipment and a third set of multiple pieces of equipment, the second set of multiple pieces of equipment having been corresponded with the first print shop prior to said compilation, and the third set of equipment having been corresponded with a second print shop;

(B) a set of multiple print shop cells to be used in forming the print shop configuration, each print shop cell including at least one piece of equipment from the first set of multiple pieces of equipment;

(C) a memory, wherein a value corresponding with the multiple print shop cells to be used in forming the print shop configuration is stored in said memory; and (D) a print shop configuration development manager communicating with said memory and including an application, said print shop configuration development manager and said application functioning cooperatively to (1) generate a list of two or more possible print shop configurations that could be formed with the multiple print shop cells to be used in forming the print shop configuration and least some of the pieces of equipment from both the second set of multiple pieces of equipment and the third set of multiple pieces of equipment, (2) determine whether a first one of the two or more possible print shop configurations is substantially equivalent to a second one of the two or more possible print shop configurations, and (3) when said equivalency exists, categorize (a) one of the first one of the two or more possible print shop configurations and the second one of the two or more possible print shop configurations as belonging to a first group of possible print shop configurations and (b) another one of the first one of the two or more possible print shop configurations and the second one of the two or more possible print shop configurations as belonging to a second group of possible print shop configurations;

in which C number of print cells are used with S number of pieces of equipment, wherein the list of two or more possible print shop configurations includes $(C+1)^s$ possible print shop configurations.

9. The print shop configuration forming system of claim 8, wherein a third print shop corresponds with a fourth set of multiple pieces, and wherein the first set of multiple pieces of equipment is formed by compiling selected pieces of equipment from the second set of multiple pieces of equipment, the third set of multiple pieces of equipment and/or the fourth set of multiple pieces of equipment.

10. The print shop configuration forming system of claim 8, wherein the print shop configuration also includes a fourth print shop, and wherein said first set of multiple print shop cells are to be distributed across a print shop configuration including both the first and fourth print shops.

11. The print shop configuration forming system of claim 8, in which the first one of the two or more possible print shop configurations corresponds with a first functionality vector and the second one of the two or more possible print shop configurations corresponds with a second functionality vector, wherein substantial equivalency between the first and second sets is determined by comparing the first functionality vector with the second functionality vector.

12. The print shop configuration forming system of claim 11, wherein said substantial equivalency exists when the first functionality vector differs from the second functionality vector by less than a selected tolerance amount.

13. The print shop configuration forming system of claim 8, wherein said categorizing includes performing a job processing simulation on each of the first one of the two or more possible print shop configurations and the second one of the two or more possible print shop configurations.

14. A method of forming a print shop configuration for a first print shop, the print shop configuration being capable of processing print jobs, with each print job corresponding with a set of print job requirements, and including a first set of multiple pieces of equipment, wherein the first set of multiple pieces of equipment is a consolidation of a second set of multiple pieces of equipment and a third set of multiple pieces of equipment, the second set of multiple pieces of equipment having been corresponded with the first print shop prior to said consolidation, and wherein the third set of equipment corresponds with a second print shop, comprising:
- (A) storing, in memory, a value corresponding with multiple print shop cells to be used in forming the print shop configuration, and wherein each cell includes at least one piece of equipment from the first set of multiple pieces of equipment;
- (B) generating a list of at least some of all possible print shop configurations that could be formed with the multiple print shop cells to be used in forming the print shop configuration, and at least some of the pieces of equipment from one or both of the second set of multiple pieces of equipment and the third set of multiple pieces of equipment; and
- (C) determining, for one of the two or more possible print shop configurations, whether a selected relationship exists between one or more sets of print job requirements and at least one of the multiple print shop cells to be used in forming the print shop configuration;
- (D) deleting the one of the two or more possible print shop configurations from the list when the selected relationship does not exist; and
- (E) using C number of print cells with S number of pieces of equipment, wherein the list of two or more possible print shop configurations includes $(C+1)^s$ possible print shop configurations.

15. The method of claim 14, in which the print shop configuration also corresponds with a fourth print shop, further comprising distributing the first set of multiple print shop cells among the first and fourth print shops.

16. The method of claim 14, in which each one of the one or more print job requirement sets corresponds with a first functionality vector and the one of the one or more print processing related cells corresponds with a second functionality vector, wherein the existence of the selected relationship is determined by comparing the first functionality vector with the second functionality vector.

17. The method of claim 14, in which each of multiple job types is processed at a print shop and each one of the multiple job types is provided to the print shop at a job processing frequency, wherein the existence of the selected relationship is determined by examining multiple job processing frequencies.

18. The method of claim 14, in which multiple job requirement sets are compared with at least one of the multiple print shop cells to be used in forming the print shop configuration, wherein the existence of selected relationship is determined by referring to the percent of multiple job requirement sets that can be processed with the at least one of the multiple print shop cells to be used in forming the print shop configuration.

19. The method of claim 14, wherein said (D) includes generating the list in such a way that the list includes all of the possible print shop configurations that can be formed with one or both of the second and third sets of multiple pieces of equipment.

20. A method of forming a print shop configuration for a first print shop, the print shop configuration being capable of processing print jobs, wherein a first set of multiple pieces of equipment is compiled from both a second set of multiple pieces of equipment and a third set of multiple pieces of equipment, the second set of multiple pieces of equipment having been corresponded with the first print shop prior to said compilation, and the third set of equipment having been corresponded with a second print shop, and wherein each print shop cell, in a set of multiple print cells, includes at least one piece of equipment from the first set of multiple pieces of equipment, comprising:
- (A) storing a value, corresponding with the multiple print shop cells to be used in forming the print shop configuration, in memory; and
- (B) generating a list of two or more possible print shop configurations that could be formed with the multiple print shop cells to be used in forming the print shop configuration and least some of the pieces of equipment from both the second set of multiple pieces of equipment and the third set of multiple pieces of equipment;
- (C) determining whether a first one of the two or more possible print shop configurations is substantially equivalent to a second one of the two or more possible print shop configurations;
- (D) when said substantial equivalency exists, categorizing (1) one of the first one of the two or more possible print shop configurations and the second one of the two or more possible print shop configurations as belonging to a first group of possible print shop configurations and (2) another one of the first one of the two or more possible print shop configurations and the second one of the two or more possible print shop configurations as belonging to a second group of possible print shop configurations; and
- (E) using C number of print cells with S number of pieces of equipment, wherein the list of two or more possible print shop configurations includes $(C+1)^s$ possible print shop configurations.

21. The method of claim 20, in which the print shop configuration also corresponds with a fourth print shop, further comprising distributing the first set of multiple print shop cells among the first and fourth print shops.

22. The method of claim 20, in which the first one of the two or more possible print shop configurations corresponds with a first functionality vector and the second one of the two or more possible print shop configurations corresponds with a second functionality vector, wherein (C) includes comparing the first functionality vector with the second functionality vector.

23. The method of claim 20, wherein said (D) includes performing a job processing simulation on each of the first one of the two or more possible print shop configurations and the second one of the two or more possible print shop configurations.

* * * * *